(12) United States Patent  
Lee et al.

(10) Patent No.: US 9,152,173 B2  
(45) Date of Patent: Oct. 6, 2015

(54) TRANSPARENT DISPLAY DEVICE

(71) Applicant: Microsoft Corporation, Redmond, WA (US)

(72) Inventors: Jinha Lee, Seoul (KR); Catherine N. Boulanger, Redmond, WA (US); Steven Nabil Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 13/647,507

(22) Filed: Oct. 9, 2012

(65) Prior Publication Data

US 2014/0098085 A1 Apr. 10, 2014

(51) Int. Cl.
| | |
|---|---|
| G06T 15/00 | (2011.01) |
| G09G 5/00 | (2006.01) |
| G09G 5/08 | (2006.01) |
| G06F 1/16 | (2006.01) |
| G06F 3/0487 | (2013.01) |
| G06F 3/01 | (2006.01) |
| G06F 3/0481 | (2013.01) |

(52) U.S. Cl.
CPC ............ G06F 1/1601 (2013.01); G06F 3/017 (2013.01); G06F 3/0487 (2013.01); G06F 3/04815 (2013.01); G06F 2203/04803 (2013.01); G06F 2203/04804 (2013.01)

(58) Field of Classification Search
CPC .................. G06F 1/1601; G06F 2203/04803; G06F 2203/04804; G06F 3/017; G06F 3/04815; G06F 3/0487
See application file for complete search history.

(56) References Cited

U.S. PATENT DOCUMENTS

| | | | |
|---|---|---|---|
| 4,046,975 | A | 9/1977 | Seeger, Jr. |
| 4,065,649 | A | 12/1977 | Carter et al. |
| 4,239,338 | A | 12/1980 | Borrelli et al. |
| 4,243,861 | A | 1/1981 | Strandwitz |

(Continued)

FOREIGN PATENT DOCUMENTS

| | | |
|---|---|---|
| CN | 1352767 | 6/2002 |
| CN | 1440513 | 9/2003 |

(Continued)

OTHER PUBLICATIONS

"International Search Report and Written Opinion", Application No. PCT/US2013/051421, Dec. 6, 2013, 10 pages.

(Continued)

*Primary Examiner* — Kee M Tung
*Assistant Examiner* — Frank Chen
(74) *Attorney, Agent, or Firm* — Jeremy Snodgrass; Judy Yee; Micky Minhas

(57) ABSTRACT

This document describes techniques and apparatuses for implementing a transparent display device. A transparent display device includes a transparent or translucent screen to render images on the screen, and to render virtual objects that appear to be in a three-dimensional (3D) space behind the screen. The transparent display device also includes a hand tracker to sense movement of a user's hands to interact with one or more of the virtual objects, and to generate 3D-input based on the movement. The transparent or translucent screen enables the user to see the user's hands behind the screen as the user's hands interact with the one or more virtual objects. The transparent display device is controlled to modify the rendering of the images on the screen or the virtual objects behind the screen based on the 3D-input.

15 Claims, 11 Drawing Sheets

(56) References Cited

U.S. PATENT DOCUMENTS

| | | | |
|---|---|---|---|
| 4,302,648 A | 11/1981 | Sado et al. |
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,576,436 A | 3/1986 | Daniel |
| 4,588,187 A | 5/1986 | Dell |
| 4,607,147 A | 8/1986 | Ono et al. |
| 4,615,579 A | 10/1986 | Whitehead |
| 4,651,133 A | 3/1987 | Ganesan et al. |
| 5,220,521 A | 6/1993 | Kikinis |
| 5,283,559 A | 2/1994 | Kalendra et al. |
| 5,331,443 A | 7/1994 | Stanisci |
| 5,339,382 A | 8/1994 | Whitehead |
| 5,406,415 A | 4/1995 | Kelly |
| 5,548,477 A | 8/1996 | Kumar et al. |
| 5,558,577 A | 9/1996 | Kato |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,861,990 A | 1/1999 | Tedesco |
| 5,874,697 A | 2/1999 | Selker et al. |
| 5,926,170 A | 7/1999 | Oba |
| 5,971,635 A | 10/1999 | Wise |
| 5,999,147 A | 12/1999 | Teitel |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,046,857 A | 4/2000 | Morishima et al. |
| 6,061,644 A | 5/2000 | Leis |
| 6,178,443 B1 | 1/2001 | Lin |
| 6,195,136 B1 | 2/2001 | Handschy et al. |
| 6,232,934 B1 | 5/2001 | Heacock et al. |
| 6,238,078 B1 | 5/2001 | Hed |
| 6,254,105 B1 | 7/2001 | Rinde et al. |
| 6,279,060 B1 | 8/2001 | Luke et al. |
| 6,300,986 B1 | 10/2001 | Travis |
| 6,329,617 B1 | 12/2001 | Burgess |
| 6,342,871 B1 | 1/2002 | Takeyama |
| 6,344,791 B1 | 2/2002 | Armstrong |
| 6,353,503 B1 | 3/2002 | Spitzer et al. |
| 6,362,861 B1 | 3/2002 | Hertz et al. |
| 6,380,497 B1 | 4/2002 | Hashimoto et al. |
| 6,437,682 B1 | 8/2002 | Vance |
| 6,469,755 B1 | 10/2002 | Adachi et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,617,536 B2 | 9/2003 | Kawaguchi |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,795,146 B2 | 9/2004 | Dozov et al. |
| 6,813,143 B2 | 11/2004 | Makela |
| 6,819,316 B2 | 11/2004 | Schulz et al. |
| 6,833,955 B2 | 12/2004 | Niv |
| 6,847,488 B2 | 1/2005 | Travis |
| 6,856,506 B2 | 2/2005 | Doherty et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,007,238 B2 | 2/2006 | Glaser |
| 7,025,908 B1 | 4/2006 | Hayashi et al. |
| 7,051,149 B2 | 5/2006 | Wang et al. |
| 7,058,252 B2 | 6/2006 | Woodgate et al. |
| 7,066,634 B2 | 6/2006 | Kitamura et al. |
| 7,091,436 B2 | 8/2006 | Serban |
| 7,101,048 B2 | 9/2006 | Travis |
| 7,106,222 B2 | 9/2006 | Ward et al. |
| 7,123,292 B1 | 10/2006 | Seeger et al. |
| 7,152,985 B2 | 12/2006 | Benitez et al. |
| 7,194,662 B2 | 3/2007 | Do et al. |
| 7,199,931 B2 | 4/2007 | Boettiger et al. |
| 7,213,991 B2 | 5/2007 | Chapman et al. |
| 7,218,830 B2 | 5/2007 | Iimura |
| 7,277,087 B2 | 10/2007 | Hill et al. |
| 7,400,805 B2 | 7/2008 | Abu-Ageel |
| 7,447,934 B2 | 11/2008 | Dasari et al. |
| 7,469,386 B2 | 12/2008 | Bear et al. |
| 7,499,037 B2 | 3/2009 | Lube |
| 7,499,216 B2 | 3/2009 | Niv et al. |
| 7,502,803 B2 | 3/2009 | Culter et al. |
| 7,515,143 B2 | 4/2009 | Keam et al. |
| 7,542,052 B2 | 6/2009 | Solomon et al. |
| 7,558,594 B2 | 7/2009 | Wilson |
| 7,559,834 B1 | 7/2009 | York |
| 7,561,131 B2 | 7/2009 | Ijzerman et al. |
| 7,636,921 B2 | 12/2009 | Louie |
| 7,643,213 B2 | 1/2010 | Boettiger et al. |
| 7,656,392 B2 | 2/2010 | Bolender |
| 7,733,326 B1 | 6/2010 | Adiseshan |
| 7,777,972 B1 | 8/2010 | Chen et al. |
| 7,782,342 B2 | 8/2010 | Koh |
| 7,800,708 B2 | 9/2010 | Brott et al. |
| 7,813,715 B2 | 10/2010 | McKillop et al. |
| 7,855,716 B2 | 12/2010 | McCreary et al. |
| 7,884,807 B2 | 2/2011 | Hovden et al. |
| D636,397 S | 4/2011 | Green |
| 7,918,559 B2 | 4/2011 | Tesar |
| 7,928,964 B2 | 4/2011 | Kolmykov-Zotov et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,035,614 B2 | 10/2011 | Bell et al. |
| 8,035,624 B2 | 10/2011 | Bell et al. |
| 8,053,688 B2 | 11/2011 | Conzola et al. |
| 8,065,624 B2 | 11/2011 | Morin et al. |
| 8,069,356 B2 | 11/2011 | Rathi et al. |
| RE42,992 E | 12/2011 | David |
| 8,102,362 B2 | 1/2012 | Ricks et al. |
| 8,115,718 B2 | 2/2012 | Chen et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,220,929 B2 | 7/2012 | Miyawaki et al. |
| 8,229,509 B2 | 7/2012 | Paek et al. |
| 8,229,522 B2 | 7/2012 | Kim et al. |
| 8,243,027 B2 | 8/2012 | Hotelling et al. |
| 8,249,263 B2 * | 8/2012 | Cragun ......................... 381/61 |
| 8,310,768 B2 | 11/2012 | Lin et al. |
| 8,345,920 B2 | 1/2013 | Ferren et al. |
| 8,416,206 B2 | 4/2013 | Carpendale et al. |
| 8,466,902 B2 | 6/2013 | Boer et al. |
| 8,582,206 B2 | 11/2013 | Travis |
| 8,717,664 B2 | 5/2014 | Wang et al. |
| 8,749,529 B2 | 6/2014 | Powell et al. |
| 9,019,615 B2 | 4/2015 | Travis |
| 9,052,414 B2 | 6/2015 | Travis et al. |
| 2002/0134828 A1 | 9/2002 | Sandbach et al. |
| 2003/0165017 A1 | 9/2003 | Amitai |
| 2003/0197687 A1 | 10/2003 | Shetter |
| 2004/0052506 A1 | 3/2004 | Togino |
| 2004/0174709 A1 | 9/2004 | Buelow, II et al. |
| 2004/0258924 A1 | 12/2004 | Berger et al. |
| 2004/0268000 A1 | 12/2004 | Barker et al. |
| 2005/0001957 A1 | 1/2005 | Amimori et al. |

(56) References Cited

U.S. PATENT DOCUMENTS

| | | |
|---|---|---|
| 2005/0002073 A1 | 1/2005 | Nakamura et al. |
| 2005/0057515 A1 | 3/2005 | Bathiche |
| 2005/0059489 A1 | 3/2005 | Kim |
| 2005/0084212 A1 | 4/2005 | Fein |
| 2005/0100690 A1 | 5/2005 | Mayer et al. |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0002101 A1 | 1/2006 | Wheatley et al. |
| 2006/0028400 A1 | 2/2006 | Lapstun et al. |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0195522 A1 | 8/2006 | Miyazaki |
| 2006/0227393 A1 | 10/2006 | Herloski |
| 2006/0238550 A1 | 10/2006 | Page |
| 2006/0239006 A1 | 10/2006 | Chaves et al. |
| 2006/0279501 A1 | 12/2006 | Lu et al. |
| 2007/0002587 A1 | 1/2007 | Miyashita |
| 2007/0047260 A1 | 3/2007 | Lee et al. |
| 2007/0062089 A1 | 3/2007 | Homer et al. |
| 2007/0072474 A1 | 3/2007 | Beasley et al. |
| 2007/0182663 A1 | 8/2007 | Biech |
| 2007/0189667 A1 | 8/2007 | Wakita et al. |
| 2007/0234420 A1 | 10/2007 | Novotney et al. |
| 2007/0236408 A1 | 10/2007 | Yamaguchi et al. |
| 2007/0247432 A1 | 10/2007 | Oakley |
| 2007/0260892 A1 | 11/2007 | Paul et al. |
| 2007/0279744 A1 | 12/2007 | Fujimoto |
| 2007/0283179 A1 | 12/2007 | Burnett et al. |
| 2008/0005423 A1 | 1/2008 | Jacobs et al. |
| 2008/0080166 A1 | 4/2008 | Duong et al. |
| 2008/0088593 A1 | 4/2008 | Smoot |
| 2008/0094398 A1* | 4/2008 | Ng et al. ............... 345/427 |
| 2008/0104437 A1 | 5/2008 | Lee |
| 2008/0122803 A1 | 5/2008 | Izadi et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0179507 A2 | 7/2008 | Han |
| 2008/0225205 A1 | 9/2008 | Travis |
| 2008/0238884 A1 | 10/2008 | Harish |
| 2008/0253822 A1 | 10/2008 | Matias |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0033623 A1 | 2/2009 | Lin |
| 2009/0067156 A1 | 3/2009 | Bonnett et al. |
| 2009/0073957 A1 | 3/2009 | Newland et al. |
| 2009/0096738 A1 | 4/2009 | Chen et al. |
| 2009/0140985 A1 | 6/2009 | Liu |
| 2009/0142020 A1 | 6/2009 | Van Ostrand et al. |
| 2009/0189974 A1 | 7/2009 | Deering |
| 2009/0200384 A1 | 8/2009 | Masalkar |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0053771 A1 | 3/2010 | Travis et al. |
| 2010/0072351 A1 | 3/2010 | Mahowald |
| 2010/0077237 A1 | 3/2010 | Sawyers |
| 2010/0085321 A1 | 4/2010 | Pundsack |
| 2010/0102206 A1 | 4/2010 | Cazaux et al. |
| 2010/0103112 A1 | 4/2010 | Yoo et al. |
| 2010/0149073 A1 | 6/2010 | Chaum et al. |
| 2010/0149100 A1* | 6/2010 | Meiby ............... 345/168 |
| 2010/0149111 A1 | 6/2010 | Olien |
| 2010/0149117 A1 | 6/2010 | Chien et al. |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0214659 A1 | 8/2010 | Levola |
| 2010/0222110 A1 | 9/2010 | Kim et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0282953 A1 | 11/2010 | Tam |
| 2010/0284085 A1 | 11/2010 | Laakkonen |
| 2010/0289457 A1 | 11/2010 | Onnerud et al. |
| 2010/0295812 A1 | 11/2010 | Burns et al. |
| 2010/0296163 A1 | 11/2010 | Saarikko |
| 2010/0302378 A1 | 12/2010 | Marks et al. |
| 2010/0302469 A1 | 12/2010 | Yue et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0325155 A1 | 12/2010 | Skinner et al. |
| 2011/0002577 A1 | 1/2011 | Van Ostrand |
| 2011/0007047 A1 | 1/2011 | Fujioka et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032215 A1 | 2/2011 | Sirotich et al. |
| 2011/0035209 A1* | 2/2011 | Macfarlane ............... 704/9 |
| 2011/0037721 A1 | 2/2011 | Cranfill et al. |
| 2011/0043479 A1 | 2/2011 | van Aerle et al. |
| 2011/0043990 A1 | 2/2011 | Mickey et al. |
| 2011/0044579 A1 | 2/2011 | Travis et al. |
| 2011/0060926 A1 | 3/2011 | Brooks et al. |
| 2011/0069148 A1 | 3/2011 | Jones et al. |
| 2011/0072391 A1 | 3/2011 | Hanggie et al. |
| 2011/0074688 A1 | 3/2011 | Hull et al. |
| 2011/0096035 A1 | 4/2011 | Shen |
| 2011/0102326 A1 | 5/2011 | Casparian et al. |
| 2011/0122071 A1 | 5/2011 | Powell |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169778 A1 | 7/2011 | Nungester et al. |
| 2011/0170289 A1 | 7/2011 | Allen et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0197156 A1 | 8/2011 | Strait et al. |
| 2011/0205372 A1 | 8/2011 | Miramontes |
| 2011/0216039 A1 | 9/2011 | Chen et al. |
| 2011/0227913 A1 | 9/2011 | Hyndman |
| 2011/0234535 A1 | 9/2011 | Hung et al. |
| 2011/0235179 A1 | 9/2011 | Simmonds |
| 2011/0242440 A1 | 10/2011 | Noma et al. |
| 2011/0242670 A1 | 10/2011 | Simmonds |
| 2011/0248920 A1 | 10/2011 | Larsen |
| 2011/0290686 A1 | 12/2011 | Huang |
| 2011/0291993 A1 | 12/2011 | Miyazaki |
| 2011/0297566 A1 | 12/2011 | Gallagher et al. |
| 2011/0304577 A1 | 12/2011 | Brown |
| 2011/0304815 A1 | 12/2011 | Newell |
| 2011/0316807 A1 | 12/2011 | Corrion |
| 2011/0317399 A1 | 12/2011 | Hsu |
| 2012/0007821 A1 | 1/2012 | Zaliva |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0062850 A1 | 3/2012 | Travis |

(56) References Cited

U.S. PATENT DOCUMENTS

| | | | |
|---|---|---|---|
| 2012/0068919 A1 | 3/2012 | Lauder et al. | |
| 2012/0075249 A1 | 3/2012 | Hoch | |
| 2012/0075256 A1 | 3/2012 | Izadi et al. | |
| 2012/0092279 A1 | 4/2012 | Martin | |
| 2012/0094257 A1 | 4/2012 | Pillischer et al. | |
| 2012/0098872 A1 | 4/2012 | Kim et al. | |
| 2012/0099749 A1 | 4/2012 | Rubin et al. | |
| 2012/0102436 A1* | 4/2012 | Nurmi | 715/863 |
| 2012/0102438 A1* | 4/2012 | Robinson et al. | 715/863 |
| 2012/0113031 A1 | 5/2012 | Lee et al. | |
| 2012/0113223 A1 | 5/2012 | Hilliges et al. | |
| 2012/0117409 A1 | 5/2012 | Lee et al. | |
| 2012/0127118 A1 | 5/2012 | Nolting et al. | |
| 2012/0140396 A1 | 6/2012 | Zeliff et al. | |
| 2012/0145525 A1 | 6/2012 | Ishikawa | |
| 2012/0146943 A1 | 6/2012 | Fairley et al. | |
| 2012/0162088 A1 | 6/2012 | van Lieshout et al. | |
| 2012/0162126 A1 | 6/2012 | Yuan et al. | |
| 2012/0162693 A1 | 6/2012 | Ito | |
| 2012/0170284 A1 | 7/2012 | Shedletsky | |
| 2012/0182242 A1 | 7/2012 | Lindahl et al. | |
| 2012/0182743 A1 | 7/2012 | Chou | |
| 2012/0188243 A1* | 7/2012 | Fujii et al. | 345/426 |
| 2012/0194448 A1 | 8/2012 | Rothkopf | |
| 2012/0195063 A1 | 8/2012 | Kim et al. | |
| 2012/0200532 A1 | 8/2012 | Powell et al. | |
| 2012/0224073 A1 | 9/2012 | Miyahara | |
| 2012/0243102 A1 | 9/2012 | Takeda et al. | |
| 2012/0243204 A1 | 9/2012 | Robinson | |
| 2012/0246377 A1 | 9/2012 | Bhesania | |
| 2012/0256959 A1 | 10/2012 | Ye et al. | |
| 2012/0268912 A1 | 10/2012 | Minami et al. | |
| 2012/0274811 A1 | 11/2012 | Bakin | |
| 2012/0300275 A1 | 11/2012 | Vilardell et al. | |
| 2013/0027354 A1 | 1/2013 | Yabuta et al. | |
| 2013/0063873 A1 | 3/2013 | Wodrich et al. | |
| 2013/0106813 A1 | 5/2013 | Hotelling et al. | |
| 2013/0107572 A1 | 5/2013 | Holman et al. | |
| 2013/0120760 A1 | 5/2013 | Raguin et al. | |
| 2013/0181926 A1* | 7/2013 | Lim | 345/173 |
| 2013/0201094 A1 | 8/2013 | Travis | |
| 2013/0207896 A1* | 8/2013 | Robinson et al. | 345/158 |
| 2013/0222353 A1 | 8/2013 | Large | |
| 2013/0229357 A1 | 9/2013 | Powell | |
| 2013/0265220 A1* | 10/2013 | Fleischmann et al. | 345/156 |
| 2013/0329301 A1 | 12/2013 | Travis | |
| 2013/0332628 A1 | 12/2013 | Panay | |
| 2014/0022629 A1 | 1/2014 | Powell | |
| 2014/0168131 A1 | 6/2014 | Rihn | |
| 2014/0233237 A1 | 8/2014 | Lutian | |
| 2014/0254032 A1 | 9/2014 | Chen | |
| 2015/0177497 A1 | 6/2015 | Travis | |

FOREIGN PATENT DOCUMENTS

| | | |
|---|---|---|
| CN | 102147643 | 8/2011 |
| EP | 0271956 | 6/1988 |
| EP | 2353978 | 8/2011 |
| EP | 2381290 | 10/2011 |
| JP | 10301055 | 11/1998 |
| JP | 10326124 | 12/1998 |
| JP | 2001174746 | 6/2001 |
| JP | 2009003053 | 1/2009 |
| JP | 2009122551 | 6/2009 |
| KR | 20110064265 | 6/2011 |
| WO | WO-9964784 | 12/1999 |
| WO | WO-0079327 | 12/2000 |
| WO | WO-2011016200 | 2/2011 |
| WO | WO-2012063410 | 5/2012 |

OTHER PUBLICATIONS

"International Search Report and Written Opinion", Application No. PCT/US2013/063156, Dec. 5, 2013, 9 pages.

"Non-Final Office Action", U.S. Appl. No. 13/409,967, Dec. 10, 2013, 5 pages.

"Non-Final Office Action", U.S. Appl. No. 13/408,257, Dec. 5, 2013, 13 pages.

"Notice of Allowance", U.S. Appl. No. 13/409,967, Feb. 14, 2014, 4 pages.

"Restriction Requirement", U.S. Appl. No. 13/494,722, Dec. 20, 2013, 6 pages.

"Accessing Device Sensors", retrieved from <https://developer.palm.com/content/api/dev-guide/pdk/accessing-device-sensors.html> on May 25, 2012, 4 pages.

"ACPI Docking for Windows Operating System", Retrieved from <http://www.scritube.com/limba/engleza/software/ACPI-Docking-for-Windows-Opera331824193.php> on Jul. 6, 2012, 10 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013), 1 page.

"First One Handed Fabric Kayboard with Bluetooth Wireless Technology", Retrieved from: <http://press.xtvworld.com/article3817.html>on May 8, 2012, (Jan. 6, 2005), 2 pages.

"For Any Kind of Proceeding 2011 Springtime as Well as Coil Nailers as Well as Hotter Summer Season", *Lady Shoe Worlds*, retrieved from <http://www.ladyshoesworld.com/2011/09/18/for-any-kind-of-proceeding-2011-springtime-as-well-as-coil-nailers-as-well-as-hotter-summer-season/> on Nov. 3, 2011, (Sep. 8, 2011), 2 pages.

"Force and Position Sensing Resistors: An Emerging Technology", *Interlink Electronics*, Available at <http://staff.science.uva.nl/~vlaander/docu/FSR/An_Exploring_Technology.pdf>, (Feb. 1990), pp. 1-6.

"Frogpad Introduces Weareable Fabric Keyboard with Bluetooth Technology", Retrieved from: <http://www.geekzone.co.nz/content.asp?contentid=3898> on Apr. 7, 2012,(Jan. 7, 2005), 3 pages.

"Incipio LG G-Slate Premium Kickstand Case—Black Nylon", Retrieved from: <http://www.amazon.com/Incipio-G-Slate-Premium-Kickstand-Case/dp/B004ZKP916> on Apr. 8, 2012, 4 pages.

"International Search Report and Written Opinion", International Application No. PCT/US2011/050471, (Apr. 9, 2012), 8 pages.

"Membrane Keyboards & Membranes Keypads", Retrieved from: <http://www.pannam.com/> on May 9, 2012, (Mar. 4, 2009), 2 pages.

"Microsoft Develops Glasses-Free Eye-Tracking 3D Display", *TechFAQ*, retrieved from <http://www.tech-faq.com/microsoft-develops-glasses-free-eye-tracking-3d-display.html> on Nov. 2, 2011, 3 pages.

"Motion Sensors", *Android Developers*, retrieved from <http://developer.android.com/guide/topics/sensors/sensors_motion.html> on May 25, 2012, 7 pages.

"Non-Final Office Action", U.S. Appl. No. 12/882,994, (Feb. 1, 2013), 17 pages.

"Non-Final Office Action", U.S. Appl. No. 13/471,001, (Feb. 19, 2013), 15 pages.

"Non-Final Office Action", U.S. Appl. No. 13/471,139, (Mar. 21, 2013), 12 pages.

"Non-Final Office Action", U.S. Appl. No. 13/471,202, (Feb. 11, 2013), 10 pages.

"Non-Final Office Action", U.S. Appl. No. 13/471,336, (Jan. 18, 2013), 14 pages.

"Non-Final Office Action", U.S. Appl. No. 13/651,195, (Jan. 2, 2013), 14 pages.

"Non-Final Office Action", U.S. Appl. No. 13/651,232, (Jan. 17, 2013), 15 pages.

"Non-Final Office Action", U.S. Appl. No. 13/651,272, (Feb. 12, 2013), 10 pages.

"Non-Final Office Action", U.S. Appl. No. 13/651,287, (Jan. 29, 2013), 13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013), 14 pages.

"Non-Final Office Action", U.S. Appl. No. 13/651,976, (Feb. 22, 2013), 16 pages.

(56) References Cited

OTHER PUBLICATIONS

"Non-Final Office Action", U.S. Appl. No. 13/653,321, (Feb. 1, 2013), 13 pages.
"Non-Final Office Action", U.S. Appl. No. 13/653,682, (Feb. 7, 2013), 11 pages.
"Notice of Allowance", U.S. Appl. No. 13/470,633, (Mar. 22, 2013), 7 pages.
"Position Sensors", *Android Developers*, retrieved from <http://developer.android.com/guide/topics/sensors/sensors_position.html> on May 25, 2012, 5 pages.
"Restriction Requirement", U.S. Appl. No. 13/471,139, (Jan. 17, 2013), 7 pages.
"Restriction Requirement", U.S. Appl. No. 13/651,304, (Jan. 18, 2013), 7 pages.
"Restriction Requirement", U.S. Appl. No. 13/651,726, (Feb. 22, 2013), 6 pages.
"Restriction Requirement", U.S. Appl. No. 13/651,871, (Feb. 7, 2013), 6 pages.
"SoIRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012,(2011), 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008), 11 Pages.
"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.
"What is Active Alignment?", http://www.kasalis.com/active_alignment.html, retrieved on Nov. 22, 2012, 2 Pages.
Bert, et al., "Passive Matrix Addressing of Electrophoretic Image Display", *Conference on International Display Research Conference*, Retrieved from <http://www.cmst.be/publi/eurodisplay2002_s14-1.pdf>,(Oct. 1, 2002), 4 pages.
Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages
Brown, Rich "Microsoft Shows Off Pressure-Sensitive Keyboard", retrieved from <http://news.cnet.com/8301-17938 105-10304792-1.html> on May 7, 2012, (Aug. 6, 2009), 2 pages.
Burge, et al., "Determination of off-axis aberrations of imaging systems using on-axis measurements", *SPIE Proceeding*, Retrived from <http://www.loft.optics.arizona.edu/documents/journal_articles/Jim_Burge_Determination_of _off-axis_aberrations_of_imaging_systems_using_on-axis_measurements.pdf>,(Sep. 21, 2011), 10 pages.
Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.
Chang, Jee-Gong et al., "Optical Design and Analysis of LCD Backlight Units Using ASAP", *Optical Engineering*, Available at <http://www.opticsvalley.com/resources/kbasePDF/ma_oe_001_optical_design.pdf>,(Jun. 2003), 15 pages.
Crider, Michael "Sony Slate Concept Tablet "Grows" a Kickstand", Retrieved from: http://andriodcommunity.com/sony-slate-concept-tablet-grows-a-kickstand-20120116/> on May 4, 2012,(Jan. 16, 2012), 9 pages.
Dietz, Paul H., et al., "A Practical Pressure Sensitive Computer Keyboard", In Proceedings of UIST 2009,(Oct. 2009), 4 pages.
Glatt, Jeff "Channel and Key Pressure (Aftertouch).", Retrieved from: <http://home.roadrunner.com/~jgglatt/tutr/touch.htm> on Jun. 11, 2012, 2 pages.

Hanlon, Mike "ElekTex Smart Fabric Keyboard Goes Wireless", Retrieved from: <http://www.gizmag.com/go/5048/ > on May 7, 2012,(Jan. 15, 2006), 5 pages.
Izadi, Shahram et al., "ThinSight: A Thin Form-Factor Interactive Surface Technology", *Communications of the ACM*, vol. 52, No. 12, retrieved from <http://research.microsoft.com/pubs/132532/p90-izadi.pdf> on Jan. 5, 2012,(Dec. 2009), pp. 90-98.
Kaur, Sukhmani "Vincent Liew's redesigned laptop satisfies ergonomic needs", Retrived from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transaction on Electronics Packaging Manufacturing, vol. 32, No. 3,(Jul. 2009), pp. 152-156.
Lee, C.M.G "Flat-Panel Autostereoscopic 3D Display", *Optoelectronics, IET*, Available at <http://ieeexplore.ieee.org/stamp/stamp.jsp? arnumber=04455550>,(Feb. 2008), pp. 24-28.
Lee, et al., "LED Light Coupler Design for a Ultra Thin Light Guide", *Journal of the Optical Society of Korea*, vol. 11, Issue.3, Retrieved from <http://opticslab.kongyu.ac.kr/pdf/06.pdf>,(Sep. 2007), 5 pages.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
McLellan, Charles "Eleksen Wireless Fabric Keyboard: a first look", Retrieved from: <http://www.zdnetasia.com/eleksen-wireless-fabric-keyboard-a-first-look-40278954.html> on May. 7, 2012,(Jul. 17, 2006), 9 pages.
Peli, Eli "Visual and Optometric Issues with Head-Mounted Displays", *IS & T/OSA Optics & Imaging in the Information Age, The Society for Imaging Science and Technology*, available at <http://www.u.arizona.edu/~zrui3/zhang_pHMPD_spie07.pdf>,(1996), pp. 364-369.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html< on Jun. 4, 2012,(Jan. 12, 2012), 15 pages.
Schoning, Johannes et al., "Building Interactive Multi-Touch Surfaces", *Journal of Graphics, GPU, and Game Tools*, vol. 14, No. 3, available at <http://www.libavg.com/raw-attachment/wiki/Multitouch/Multitouchguide_draft.pdf>,(Nov. 2009), pp. 35-55.
Takamatsu, Seiichi et al., "Flexible Fabric Keyboard with Conductive Polymer-Coated Fibers", In Proceedings of Sensors 2011,(Oct. 28, 2011), 4 pages.
Travis, Adrian R., et al., "Flat Projection for 3-D", *In Proceedings of the IEEE*, vol. 94 Issue: 3, Available at <http://ieeexplore.ieee.org/stamp/stamp.jsp?tp=&arnumber=1605201>,(Mar. 2006), pp. 539-549.
Yan, Jin-Ren et al., "Edge-Lighting Light Guide Plate Based on Micro-Prism for Liquid Crystal Display", *Journal of Display Technology*, vol. 5, No. 9, Available at <http://ieeexplore.ieee.org/ielx5/9425/5196834/05196835.pdf?tp=&arnumber=5196835&isnumber=5196834>,(Sep. 2009), pp. 355-357.
Yu, et al., "A New Driving Scheme for Reflective Bistable Cholesteric Liquid Crystal Displays", *Society for Information Display International Symposium Digest of Technical Papers*, Retrieved from <http://www.ee.ust.hk/~eekwok/publications/1997/bcd_sid.pdf>,(May 1997), 4 pages.
Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.
Zhang, Rui "Design of Head Mounted Display", Retrieved at <<http://www.optics.arizona.edu/optomech/student%20reports/2007/Design%20of%20mounteddisplays%20Zhang.pdf>>, (Dec. 12, 2007), 6 pages.

(56) References Cited

OTHER PUBLICATIONS

"Microsoft Reveals Futuristic 3D Virtual HoloDesk Patent", Retrieved at <<http://www.patentbolt.com/2012/05/microsoft-reveals-futuristic-3d-virtual-holodesk-patent.html>>, May 23, 2012, pp. 9.

Liu, et al., "Three-dimensional PC: toward novel forms of human-computer interaction", Retrieved at <<http://www.google.co.in/url?sa=t&rct=j&q=Three-dimensional+PC:+toward+novel+forms+of+human-computer+interaction&source=web&cd=1&ved=0CfoQFjAA&url=http%3A%2F%2Fciteseerx.ist.psu.edu%2Fviewdoc%2Fdownload%3Fdoi%3D10.1.1.32.9469%26rep%3Drep1%26type%3Dpdf&ei=e1LDT-ZExtatB9vavccJ&usg=AFQjCNEdPye48rFgfbNDeYcOSjF6drQL5w>>, In the proceedings of Three-Dimensional Video Three-dimensional PC: toward novel forms of human-computer interaction, in Three-Dimensional Video and Display: Devices and Systems SPIE CR76, Nov. 5-8, 2000 Boston, MA USA.

Lee, et al., Depth-Fused 3D Imagery on an Immaterial Display:, Retrieved at <<http://ieeexplore.ieee.org/stamp/stamp.jsp?arnumber=04540094>>, In the proceedings of IEEE Transactions on Visualization and Computer Graphics, vol. 15, No. 1, Jan./Feb. 2009, pp. 20-33.

Reisman, et al., "A Screen-Space Formulation for 2D and 3D Direct Manipulation", Retrieved at <<http://innovis.cpsc.ucalgary.ca/innovis/uploads/Courses/TableTopDetails2009/Reisman2009.pdf>>, In the proceedings of the 22nd annual ACM symposium on User interface software and technlogy, Oct. 4, 2009, pp. 69-78.

Diverdi, et al., "An Immaterial Pseudo-3D Display with 3D Interaction", Retrieved at <<http://www.cs.ucsb.edu/~holl/pubs/DiVerdi-2007-3DTV.pdf>>, In the proceedings of Three-Dimensional Television: Capture, Transmission, and Display, Springer, Feb. 6, 2007, pp. 26.

Grossman, et al., "Multi-Finger Gestural Interaction with 3D Volumetric Displays", Retrieved at <<http://www.dgp.toronto.edu/papers/tgrossman_UIST2004.pdf>>, In the proceedings of the 17th annual ACM symposium on User interface software and technology, Oct. 24, 2004, pp. 61-70.

"International Search Report and Written Opinion", Application No. PCT/US2013/042550, (Sep. 24, 2013), 14 pages.

"Welcome to Windows 7", Retrieved from: <http://www.microsoft.com/en-us/download/confirmation.aspx?id=4984> on Aug. 1, 2013, (Sep. 16, 2009), 3 pages.

Prospero, Michael "Samsung Outs Series 5 Hybrid PC Tablet", Retrieved from: <http://blog.laptopmag.com/samsung-outs-series-5-hybrid-pc-tablet-running-windows-8> on Oct. 31, 2013, (Jun. 4, 2012), 7 pages.

"Final Office Action", U.S. Appl. No. 13/408,257, Mar. 28, 2014, 17 pages.

"Foreign Office Action", CN Application No. 201320328022.1, Feb. 17, 2014, 4 Pages.

"Foreign Office Action", CN Application No. 201320328022.1, Oct. 18, 2013, 3 Pages.

"Non-Final Office Action", U.S. Appl. No. 13/492,232, Apr. 30, 2014, 9 pages.

"Non-Final Office Action", U.S. Appl. No. 13/494,722, May 9, 2014, 8 pages.

"Restriction Requirement", U.S. Appl. No. 13/367,812, Mar. 11, 2014, 6 pages.

"PCT Search Report and Written Opinion", Application No. PCT/US2013/028479, (Jun. 17, 2013), 10 pages.

"PCT Search Report", Application No. PCT/US2013/042790, (Aug. 8, 2013), 9 pages.

"Notice of Allowance", U.S. Appl. No. 12/882,994, (Jul. 12, 2013), 9 pages.

"Chinese Search Report", Application No. 201110272868.3, (Apr. 1, 2013), 10 pages.

"International Search Report and Written Opinion", Application No. PCT/US2014/020050, May 9, 2014, 10 pages.

"International Search Report and Written Opinion", Application No. PCT/US2014/016654, May 16, 2014, 11 pages.

"International Search Report and Written Opinion", Application No. PCT/US2013/075180, May 6, 2014, 12 pages.

"Non-Final Office Action", U.S. Appl. No. 13/367,812, Sep. 18, 2014, 10 pages.

"Non-Final Office Action", U.S. Appl. No. 13/408,257, Jul. 2, 2014, 20 pages.

"Non-Final Office Action", U.S. Appl. No. 13/714,401, Jul. 8, 2014, 11 pages.

"Non-Final Office Action", U.S. Appl. No. 13/773,496, Jun. 23, 2014, 10 pages.

"Final Office Action", U.S. Appl. No. 13/408,257, Dec. 10, 2014, 15 pages.

"Final Office Action", U.S. Appl. No. 13/492,232, Nov. 17, 2014, 13 pages.

"Final Office Action", U.S. Appl. No. 13/714,401, Nov. 25, 2014, 15 pages.

"Final Office Action", U.S. Appl. No. 13/773,496, Nov. 4, 2014, 11 pages.

"Non-Final Office Action", U.S. Appl. No. 13/786,233, Nov. 20, 2014, 13 pages.

"Notice of Allowance", U.S. Appl. No. 13/494,722, Dec. 18, 2014, 7 pages.

"Written Opinion", Application No. PCT/US2014/020050, Sep. 22, 2014, 6 Pages.

"Advisory Action", U.S. Appl. No. 13/408,257, Apr. 8, 2015, 9 pages.

"Non-Final Office Action", U.S. Appl. No. 13/492,232, Feb. 24, 2015, 12 pages.

"Non-Final Office Action", U.S. Appl. No. 13/714,401, Apr. 17, 2015, 14 pages.

"Notice of Allowance", U.S. Appl. No. 13/367,812, Jan. 30, 2015, 8 pages.

"Final Office Action", U.S. Appl. No. 13/492,232, Jul. 10, 2015, 11 pages.

"Final Office Action", U.S. Appl. No. 13/714,401, Aug. 4, 2015, 15 pages.

"Final Office Action", U.S. Appl. No. 13/786,233, May 27, 2015, 14 pages.

"Foreign Office Action", CN Application No. 201310225788.1, Jun. 23, 2015, 14 Pages.

"Non-Final Office Action", U.S. Appl. No. 13/555,404, Aug. 17, 2015, 10 pages.

"Non-Final Office Action", U.S. Appl. No. 13/773,496, Jun. 8, 2015, 16 pages.

\* cited by examiner

TRANSPARENT DISPLAY DEVICE

BACKGROUND

In typical user interactions with windows management and content retrieval, windows of information (e.g., a web page, a word-processing document, and a picture) are concurrently projected on a two-dimensional (2D) screen. These windows of information can be visualized and navigated via a "multiple layers" view, but even in the multiple layers view some of the windows are hidden by a top layer of windows. Unlike on a physical desk where documents and objects can be scattered around, in a conventional computer desktop user interface there is no fixed position given to inactive windows behind a top active window. Thus, the user cannot cognitively register background windows to a specific position in the physical space, making it difficult and inefficient for the user to choose among different windows.

SUMMARY

This document describes techniques and apparatuses for implementing a transparent display device. A transparent display device includes a transparent or translucent screen to render images on the screen, and to render virtual objects that appear to be in a three-dimensional (3D) space behind the screen. The transparent display device also includes a hand tracker to sense movement of a user's hands to interact with one or more of the virtual objects, and to generate 3D-input based on the movement. The transparent or translucent screen enables the user to see the user's hands behind the screen as the user's hands interact with the one or more virtual objects. The transparent display device is controlled to modify the rendering of the images on the screen or the virtual objects behind the screen based on the 3D-input.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for implementing a transparent display device are described with reference to the following drawings. The same numbers are used throughout the drawings to reference like features and components.

DETAILED DESCRIPTION

Overview

This document describes techniques and apparatuses for implementing a transparent display device. A transparent display device includes a transparent or translucent screen to render images on the screen, and to render virtual objects that appear to be in a three-dimensional (3D) space behind the screen. The transparent display device also includes a hand tracker to sense movement of a user's hands to interact with one or more of the virtual objects, and to generate 3D-input based on the movement. The transparent or translucent screen enables the user to see the user's hands behind the screen as the user's hands interact with the one or more virtual objects. The transparent display device is controlled to modify the rendering of the images on the screen or the virtual objects behind the screen based on the 3D-input.

Example Environment

Figure 1:
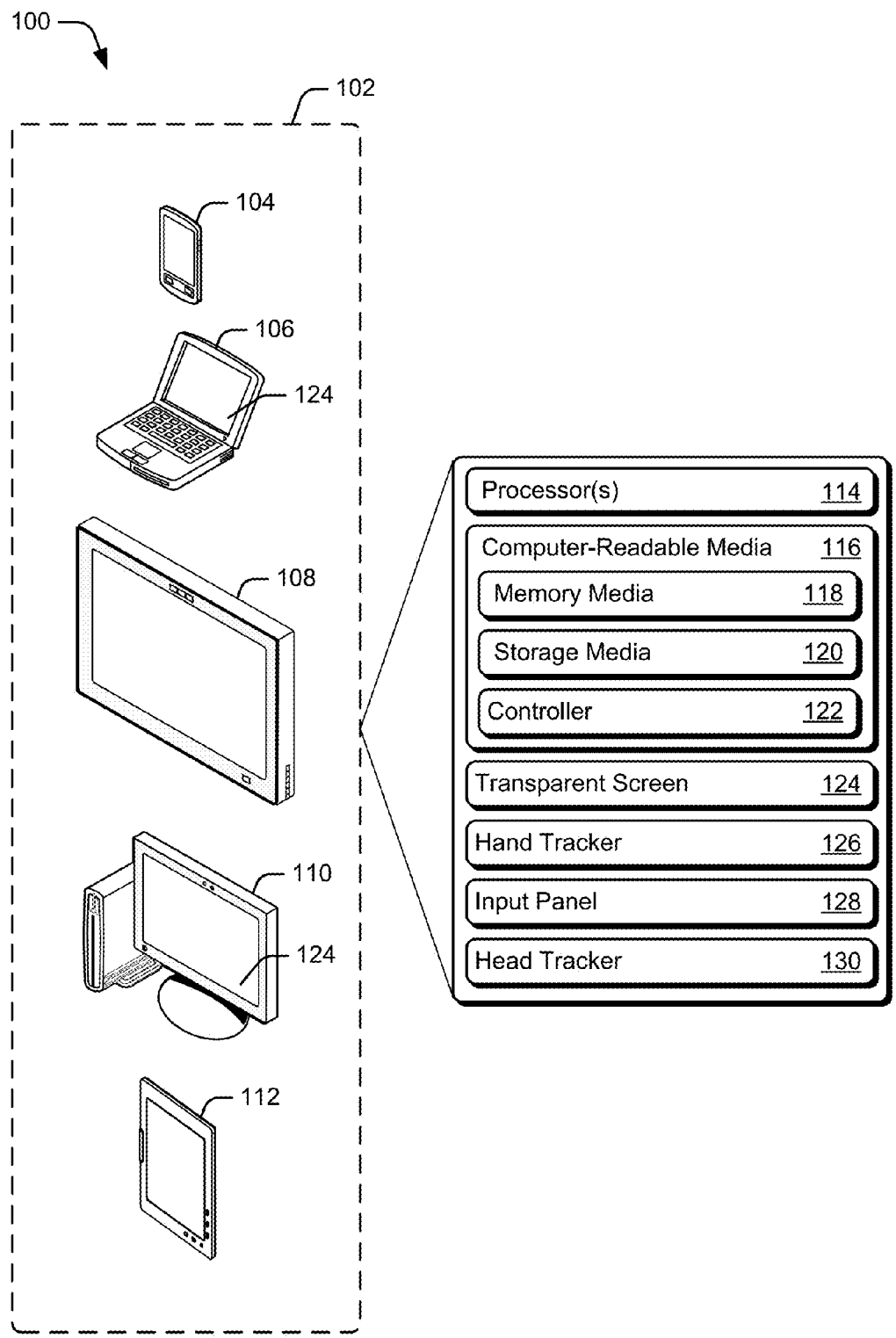
FIG. 1 illustrates an example environment in which a transparent display device can be implemented.

FIG. 1 is an illustration of an example environment 100 in which a transparent display device can be implemented. Environment 100 includes a transparent display device 102, which is illustrated, by way of example and not limitation, as one of a smart phone 104, a laptop computer 106, a television device 108, a desktop computer 110, or a tablet computer 112.

Transparent display device 102 includes processor(s) 114 and computer-readable media 116, which includes memory media 118 and storage media 120. Applications and/or an operating system (not shown) embodied as computer-readable instructions on computer-readable media 116 can be executed by processor(s) 114 to provide some or all of the functionalities described herein. Computer-readable media also includes a controller 122. How controller 122 is implemented and used varies, and is described in further detail below.

Transparent display device 102 also includes a transparent screen 124 that is configured to render images on the screen, and to render virtual objects that appear to be in a three-dimensional (3D) space behind the screen. While referred to as a transparent screen herein, transparent screen 124 can be implemented as either a transparent screen or as a semi-transparent or translucent screen. Transparent screen 124 can be implemented to render two-dimensional (2D) images and/or 3D images. For example, in some embodiments transparent screen 124 can render 2D images that are typically displayed on a 2D screen, such as a word-processing document, a PDF document, 2D pictures, or 2D video, to name just a few. Alternately or additionally, transparent screen 124 can render 3D images that can be viewed with or without eye glasses. For example, in some cases transparent screen 124 can be implemented to render 3D images using an optic such as a wedge that can be viewed by a user without the use of eye glasses. In other cases, transparent screen 124 can render 3D images that can be viewed by a user wearing eye glasses, such as shutter glasses, polarized glasses, or lenticular glassless displays, to name just a few.

As described in more detail below, transparent display device 102 can be controlled to transition between rendering the 2D images and/or 3D images on the transparent screen and rendering the virtual objects that appear to be in the 3D space behind the transparent screen. As discussed in more detail below, the images displayed on the transparent screen may be opaque, or partially opaque, to cover the virtual objects, but can be controlled to slide away to reveal the virtual objects displayed behind transparent screen 124.

In various embodiments, transparent screen 124 may be configured as a 2D or 3D flat-panel electronic display, such as a high-resolution liquid crystal display (LCD). Transparent screen 124 can be physically coupled to transparent display device 102 or implemented separate from transparent display device 102. For example, transparent screen 124 is physically coupled to laptop computer 106 but is implemented separate from desktop computer 110.

Figure 2:
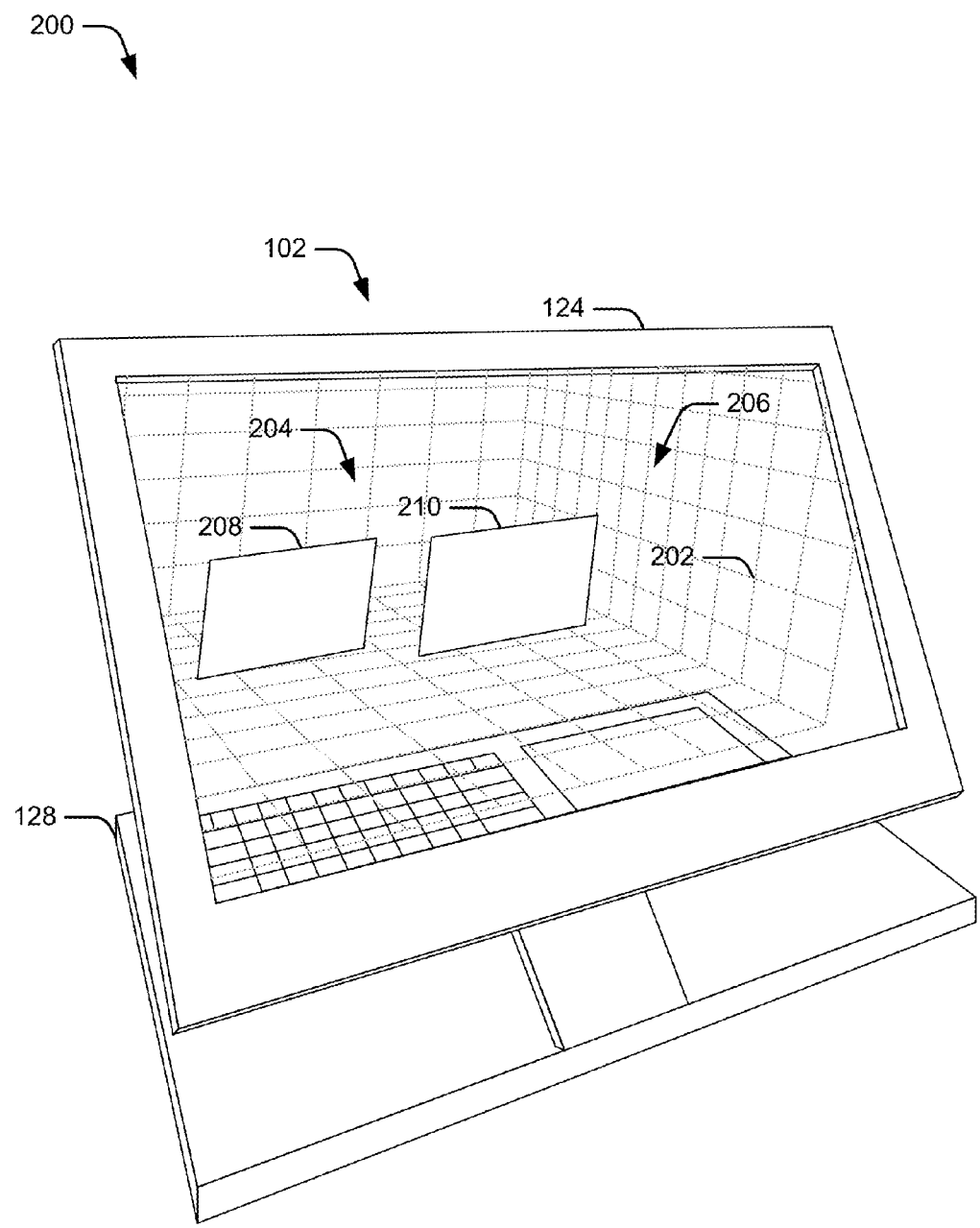
FIG. 2 illustrates a detailed example of a transparent display device.

FIG. 2 illustrates a detailed example 200 of transparent display device 102 in accordance with one embodiment. In this example, transparent screen 124 uses a grid 202 to render virtual objects 204 that appear to a user as if the virtual objects are rendered in a 3D space 206 behind transparent screen 124. It is to be appreciated that grid 202 may not be viewable by the user, but is used by transparent display device 102 to render the virtual objects so that they appear to be positioned in the 3D space behind transparent screen 124. In this example, virtual objects 204 are depicted as windows 208 and 210. Windows 208 and 210 can each represent a page associated with an application, such a web browser page, a word-processing document, or a PDF file. It is to be noted, however, that transparent screen 124 can render any type of virtual object in 3D space 206.

By rendering virtual objects 204 that appear to be in 3D space 206, transparent screen 124 enables the user to manipulate virtual objects 204 using one or both of the user's hands. It is to be noted that transparent screen 124 is transparent and thus enables the user to see the user's actual hands (as opposed to a virtual rendering of the user's hands) as the user manipulates virtual objects 204. Thus, transparent display device 102 leverages the user's spatial understanding and kinesthetic memory to access and manipulate virtual objects 204 in 3D space 206.

Transparent display device 102 also includes a hand tracker 126, which is configured to sense movement of the user's hands, such as gestures, to interact with one or more of virtual objects 204 in 3D space 206 behind transparent screen 124, and to generate 3D-input based on the movement. In an embodiment, hand tracker 126 is implemented as a depth camera that senses a 3D position, movement, and/or pose of each of the user's hands. As discussed in more detail below, controller 122 is configured to receive the 3D-input from hand tracker 126, and to modify the rendering of the 2D or 3D images on transparent screen 124 (not illustrated in FIG. 2) or virtual objects 204 in 3D space 206, based on the 3D-input.

In some embodiments, transparent display device 102 also includes an input panel 128 that is positioned behind transparent screen 124 and is configured to receive 2D-input, such as touch-input and/or key-input, from the user. In this example, as opposed to the conventional design of a laptop where the laptop screen is attached to the trailing edge (far from the user) of the keyboard panel, transparent screen 124 is coupled to a near-edge (edge closer to the user) of input panel 128. Input panel 128 may include any combination of a keyboard configured to receive key-input or a mouse, track pad, touch pad, or other 2D sensing device configured to receive touch-input. By being positioned behind transparent screen 124, input panel 128 enables the user to reach behind the transparent screen to use the input panel.

It is to be noted that because transparent screen 124 is transparent or translucent, the user may be able to see input panel 128 as the key-input or touch-input is entered. For example, when input panel 128 includes a keyboard, the user may be able to see both the keys of the keyboard and the user's fingers through the transparent screen as the user types on the keyboard. Further, the position of input panel 128 behind transparent screen 124 enables the user to easily transition between using input panel 128 (e.g., for typing) to manipulating virtual objects 204 in 3D space 206. For example, if the user is typing on the keyboard of input panel 128, the user can simply raise one or both of the user's hands in order to manipulate or interact with virtual objects 204.

Figure 3:
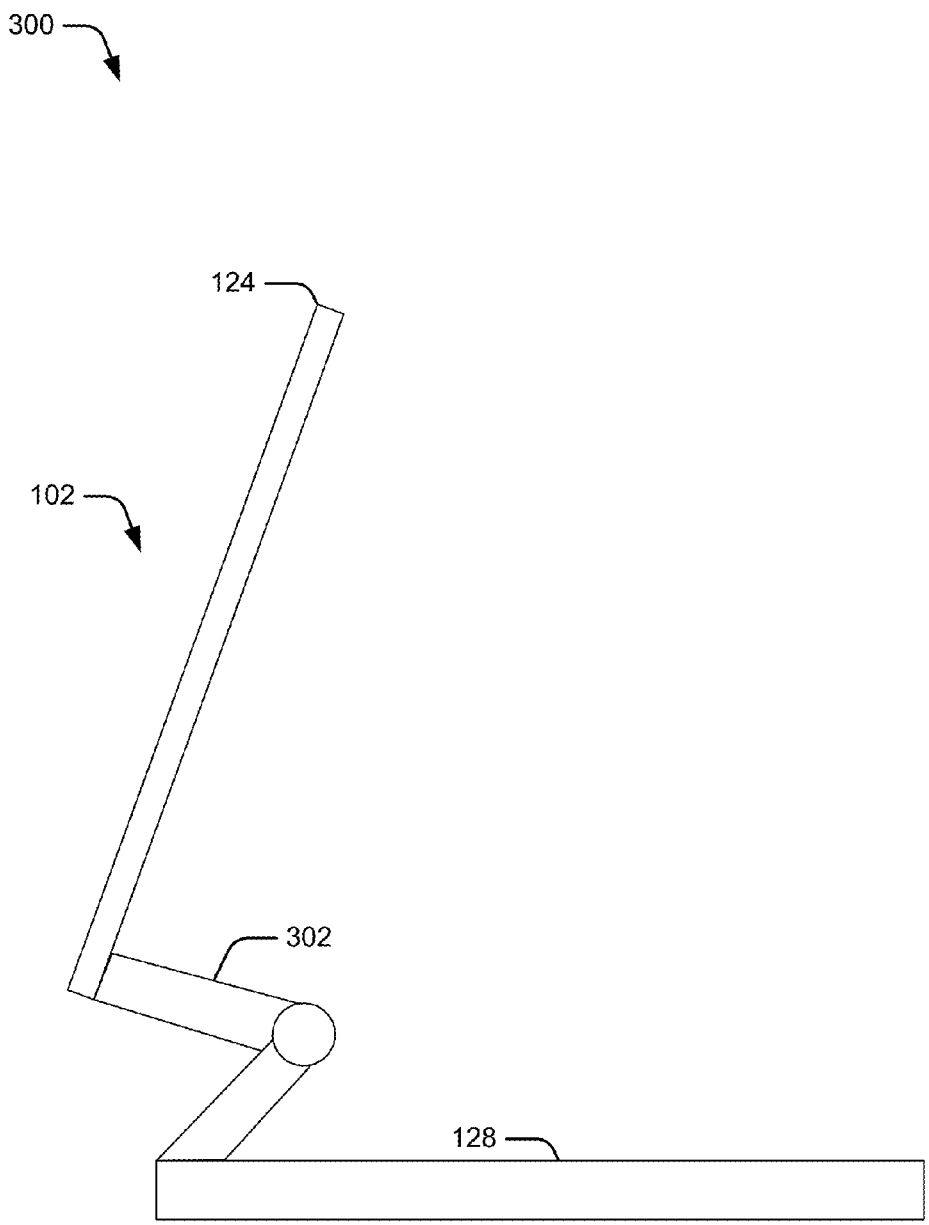
FIG. 3 illustrates a detailed example of a side-view of a transparent display device.

FIG. 3 illustrates a detailed example 300 of a side view of the transparent display device illustrated in FIG. 2. In this example, transparent screen 124 is coupled to input panel 128 via a foldable hinge 302. Foldable hinge 302 enables transparent screen 124 to fold on top of input panel 128 to close transparent display device 102. Foldable hinge 302, in this example, is attached to the middle of both transparent screen 124 and input panel 128, which enables the user to comfortably place the user's hands behind the transparent screen to use input panel 128.

While examples 200 and 300 illustrate transparent screen 124 as being physically attached to input panel 128, alternately input panel 128 may be positioned behind transparent screen 124 without being physically connected to the transparent screen. For example, transparent screen 124 may be implemented as a desktop monitor, and input panel 128 may be implemented as a keyboard and/or mouse that can be placed behind the desktop monitor.

In some embodiments, transparent display device 102 also includes a head tracker 130 that is configured to track a position of the user's head or eyes relative to transparent screen 124. Controller 122 is configured to render, or modify the rendering of, virtual objects 204 based on the position of the user's head or eyes so that the virtual objects appear to be in 3D space 206. Head tracker 130 can be implemented as a 3D camera or as an array of cameras. In various embodiments, both hand tracker 126 and head tracker 130 may be implemented as short-range depth cameras. In example 200, hand tracker 126 and head tracker 130 can be mounted to transparent screen 124, making transparent display device 102 truly a mobile device. Thus, controller 122 controls transparent display device 102 to render virtual objects 204 on transparent screen 124 that are updated in real time based on the user's eye or head position, such that the user perceives that the virtual objects are displayed behind the transparent screen at a programmed set position.

Figure 4A:
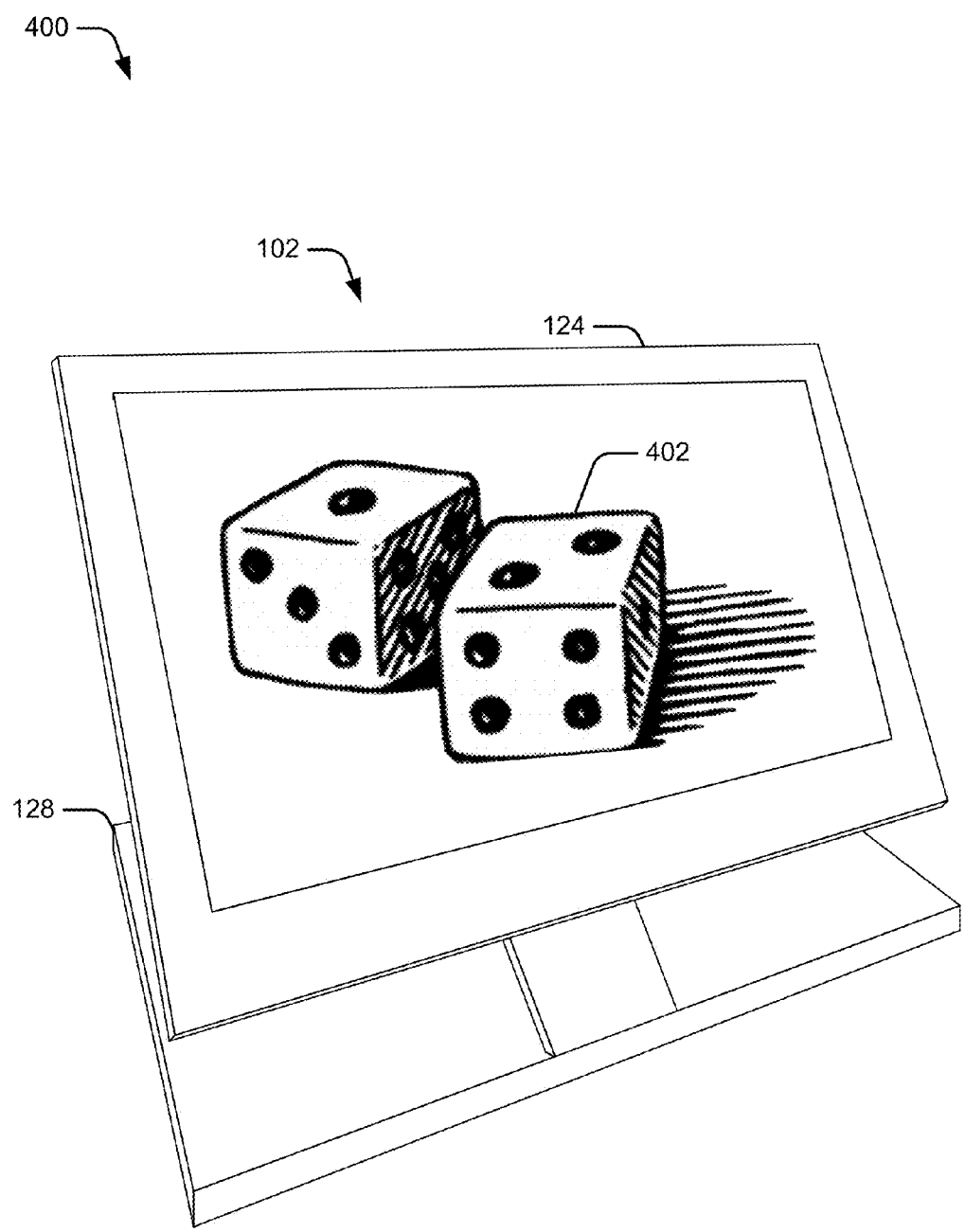
FIG. 4a illustrates a detailed example of a transparent display device rendering a 2D image.

FIG. 4a illustrates a detailed example 400 of transparent display device 102 in accordance with one embodiment. In this example, transparent display device 102 renders a 2D or 3D image 402 on the surface of transparent screen 124. Image 402 may be any type of 2D image that can be displayed on a conventional 2D screen, or 3D image that can be displayed on a 3D screen. In this example, image 402 is a picture of a pair of dice. Note, however, that transparent screen 124 may display image 402 as a web browser window, a word-processing document, a picture, or a PDF file, to name just a few examples. The user can interact with image 402 using input panel 128. For example, the user can type on the keyboard of input panel 128 to write an email message, or use a track pad or mouse of the input panel to modify the size of image 402.

Transparent display device 102 receives the 2D-input from the user via input panel 128, and controller 122 controls the transparent display device to modify the rendering of image 402 on the transparent screen based on the 2D-input.

Figure 4B:
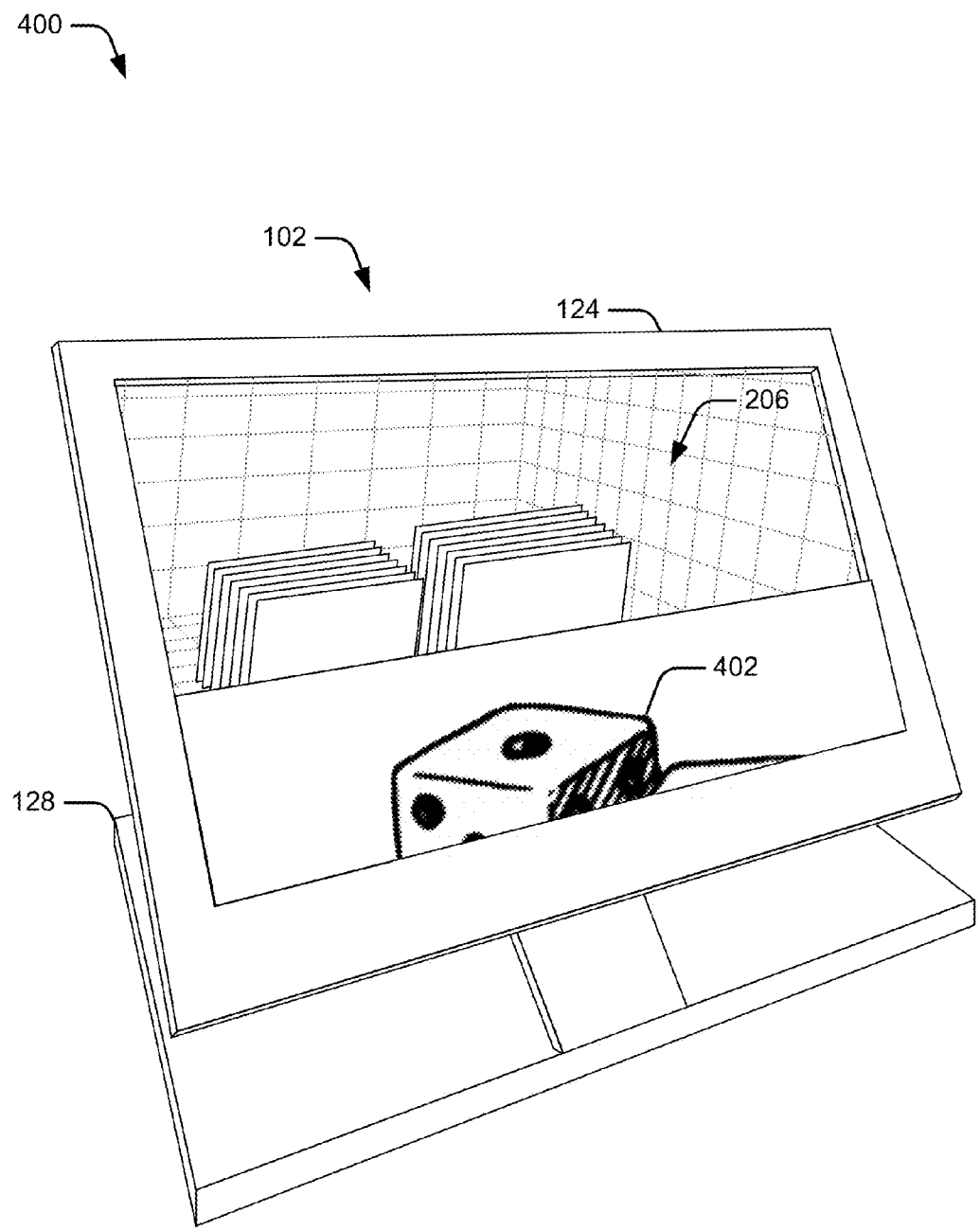
FIG. 4b illustrates a detailed example of a transparent display device implementing a sliding door technique.

In various embodiments, transparent display device 102 employs a "sliding door" technique when the user raises one or both of the user's hands off of input panel 128 to reach into the 3D space behind transparent screen 124. Consider for example that in FIG. 4b the user raises one of the user's hands off of input panel 128 to reach into 3D space 206. Hand tracker 126 senses this movement, and generates 3D-input that is received by controller 122. Controller 122 then controls transparent screen 124 to slide the rendering of image 402 to reveal one or more virtual objects that appear to be in 3D space 206 behind transparent screen 124. In this example, the rendering of image 402 is controlled to slide down transparent screen 124. Alternately, however, the rendering of image 402 can be controlled to slide up transparent screen 124 or to slide across (e.g., slide left across or slide right across) transparent screen 124. In some embodiments, image 402 can also or instead be controlled to fade, dissolve, or transition in any other way to reveal the virtual objects in 3D space 206.

After the rendering of the image on the screen slides to reveal the virtual objects, the user can interact with the virtual objects using one or both of the user's hands. In an embodiment, when the user lowers the user's hand to go back to entering input using input panel 128, hand tracker 126 senses the movement of the user's hand to reach towards the input panel and generates 3D-input that is received by controller 122. Controller 122 then controls transparent screen 124 to slide the rendering of image 402 to cover the one or more virtual objects (e.g., slide back up, back down, back left, or back right). It is to be appreciated, therefore, that the sliding door technique enables the user to easily transition between entering 2D-input via input panel 128 and entering 3D-input using the user's hands in 3D space 206.

Figure 5A:
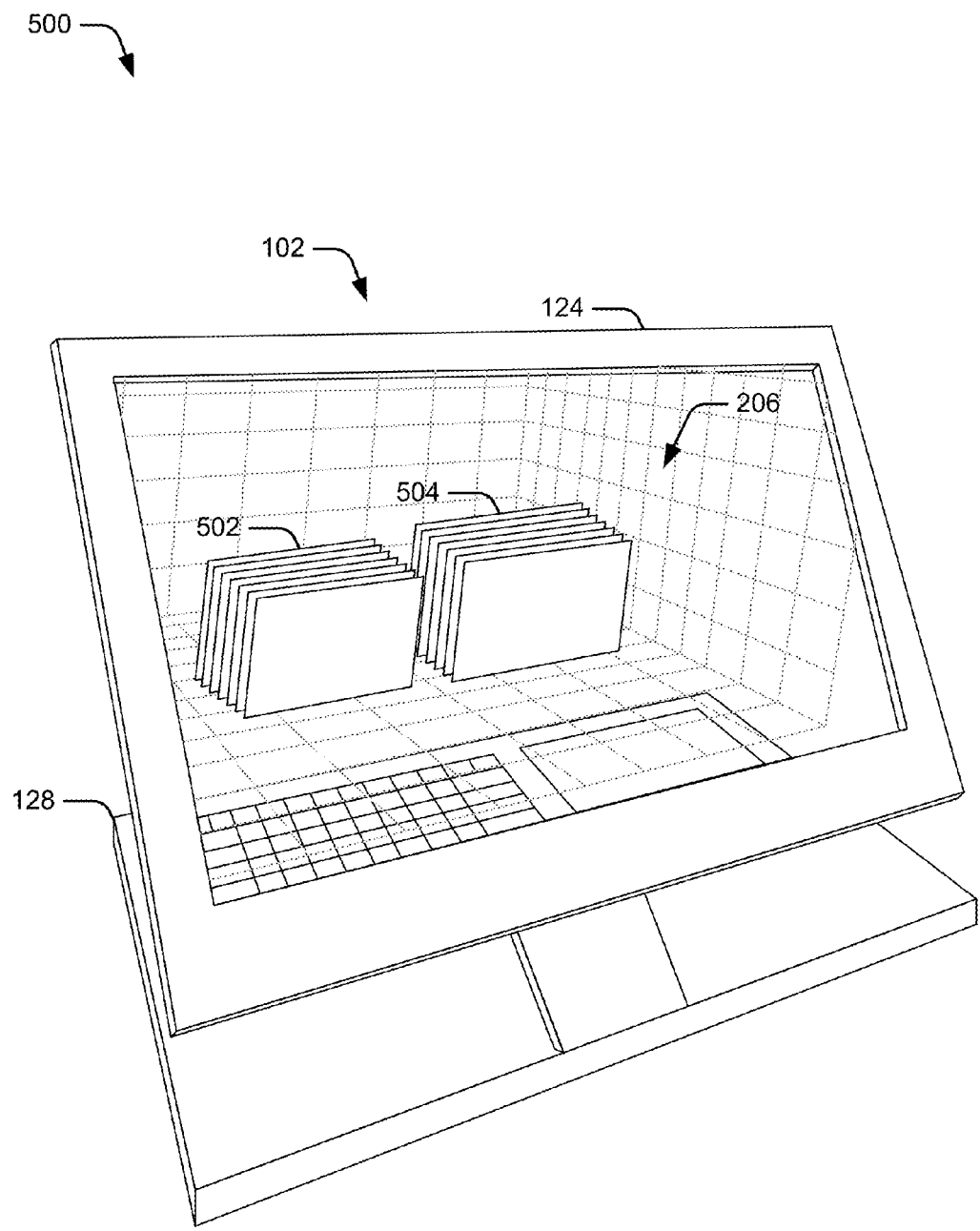
FIG. 5a illustrates a detailed example of a transparent display device rendering multiple windows stacked in 3D volumes.

Transparent display device 102 enables the user to interact with virtual objects that appear to be in the 3D space behind transparent screen 124 in a variety of different ways. In an embodiment, transparent display device 102 employs a "virtual cabinet" technique to cause transparent screen 124 to render multiple windows stacked in one or more 3D volumes that appear to be in 3D space 206. For example, FIG. 5a illustrates another detailed example 500 of transparent display device 102 in accordance with one embodiment. In this example, transparent screen 124 renders multiple windows stacked in 3D volumes 502 and 504 that appear to be in 3D space 206. Each of the windows stacked in 3D volumes 502 and 504 can represent a page associated with an application, such a web browser page, a word-processing document, or a PDF file.

Transparent display device 102 enables the user to interact with 3D volumes 502 and 504 in 3D space 206 by positioning one or both of the user's hands near the 3D volumes in 3D space 206. Hand tracker 126 is configured to sense movement of the user's hand behind the transparent screen to select one of 3D volumes 502 or 504, and to generate 3D-input based on the movement. Responsive to receiving the 3D-input from hand tracker 126, controller 122 controls transparent display device 102 to render the selected 3D volume as open on transparent screen 124 to enable the user to interact with the multiple windows stacked in the selected 3D volume.

Figure 5B:
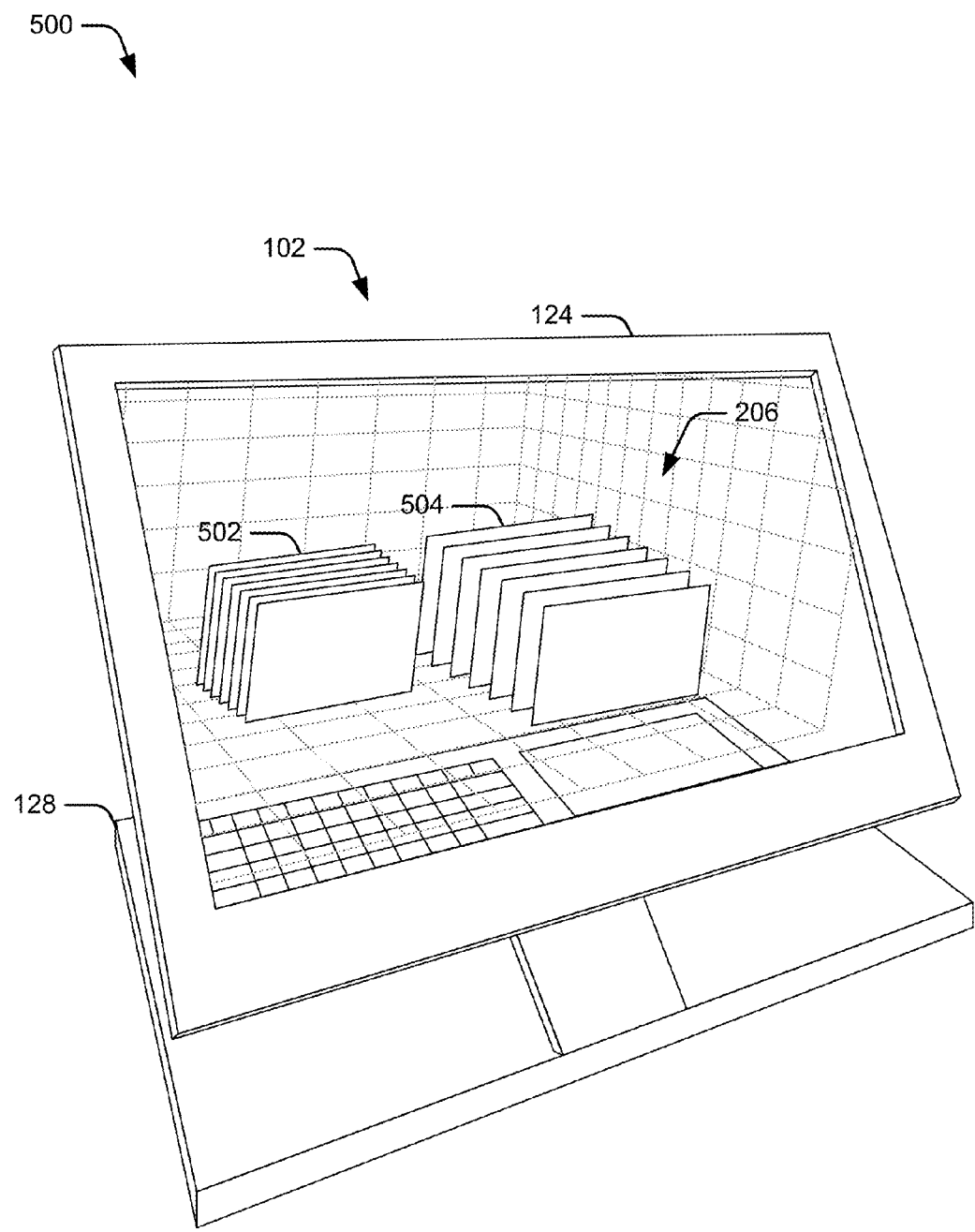
FIG. 5b illustrates another detailed example of a transparent display device rendering multiple windows stacked in 3D volumes.

It is to be noted that rendering the 3D volume as open enables the user to more easily view the multiple windows in the selected 3D volume. For example, in FIG. 5a, 3D volumes 502 and 504 are rendered as closed making it difficult for the user to see, or select, each individual window in 3D volumes 502 and 504. In FIG. 5b, if the user moves the user's hand to select 3D volume 504, the movement of the user's hand is sensed by hand tracker 126 which generates 3D-input that is received by controller 122. Controller 122 then controls transparent screen 124 to modify the rendering of 3D volume 504 to render 3D volume 504 as open. For example, as illustrated in FIG. 5b, the windows in 3D volume 504 are open, or spread out, as compared to the windows in 3D volume 502. Opening the 3D volume enables the user to more easily see, and thus more easily interact with, each of the windows in 3D volume 504.

Transparent display device 102 enables the user to interact with the multiple windows in open 3D volume 504 by positioning one or both of the user's hands near the multiple windows in 3D space 206. For example, in FIG. 5c if the user moves the user's hand to one of the multiple windows 506 in 3D volume 504, the movement of the user's hand is sensed by hand tracker 126 which generates 3D-input. Controller 122 receives the 3D-input and controls transparent screen 124 to render selected window 506 as selected. For example, in FIG. 5c controller 122 controls transparent display device 102 to render window 506 as selected by causing window 506 to "pop up" out of 3D volume 504. Popping window 506 out of 3D volume 504 enables the user to see more information regarding window 506. The user can then select window 506, such as by pinching the window, to display the window as a 2D image on transparent screen 124.

Figure 5C:
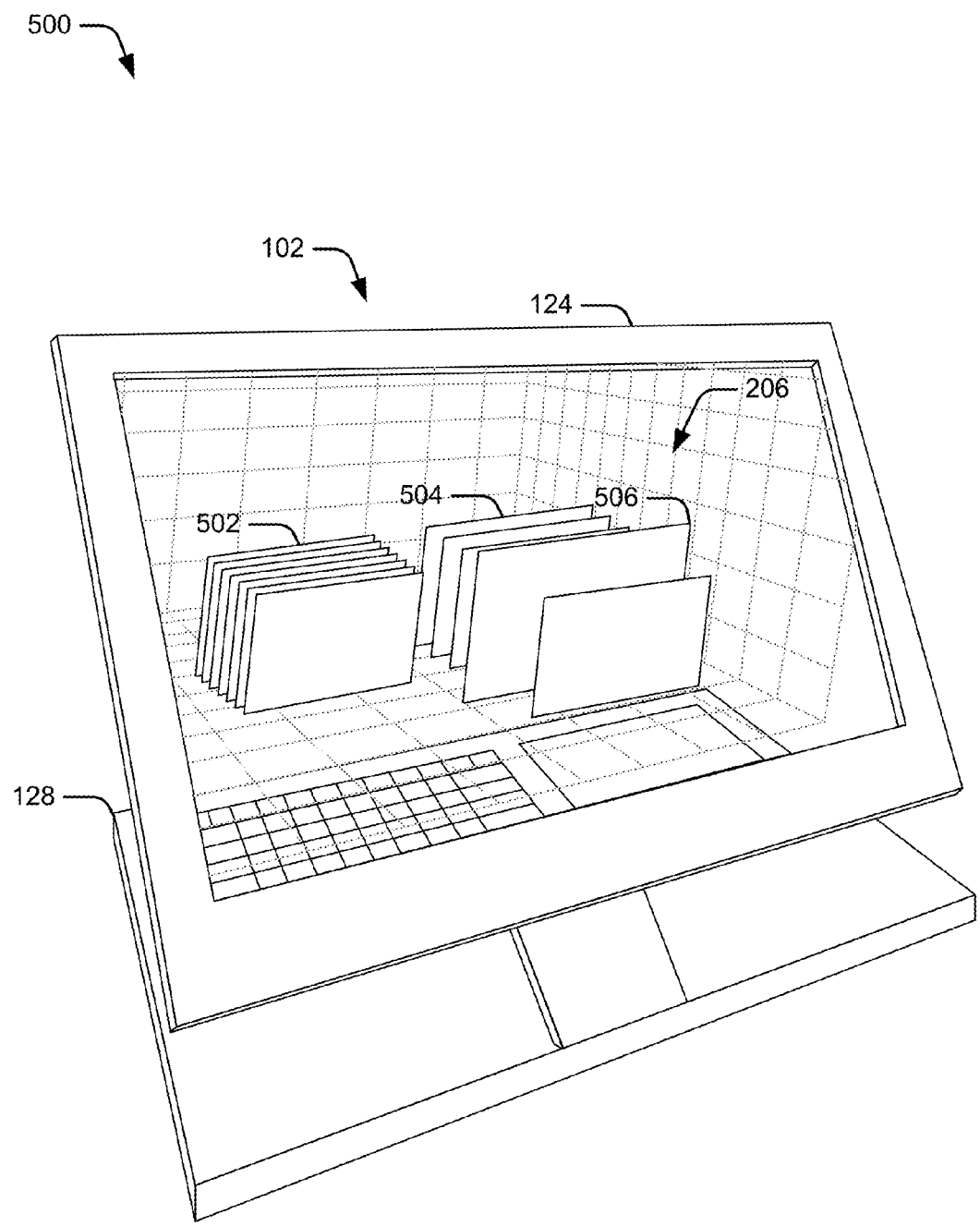
FIG. 5c illustrates another detailed example of a transparent display device rendering multiple windows stacked in 3D volumes.

In various embodiments, transparent display device 102 is configured to provide feedback on transparent screen 124 based on the location of the user's hands in 3D space 206. In one embodiment, for example, controller 122 alters the color of the transparent screen based on the location of the user's hand. In FIG. 5c, for example, controller 122 can cause an area around window 506 to glow as the user reaches the user's hand towards window 506. This feedback helps the user interact with the windows in 3D space 206. In another embodiment, a 3D cursor can be displayed which is mapped to a position of the user's hand or finger. In another embodiment, controller 122 can cause a part of the screen to not be rendered based on the location of the user's hand to render an illusion of the user's hand being in front of a virtual object.

Example Methods

Figure 6:
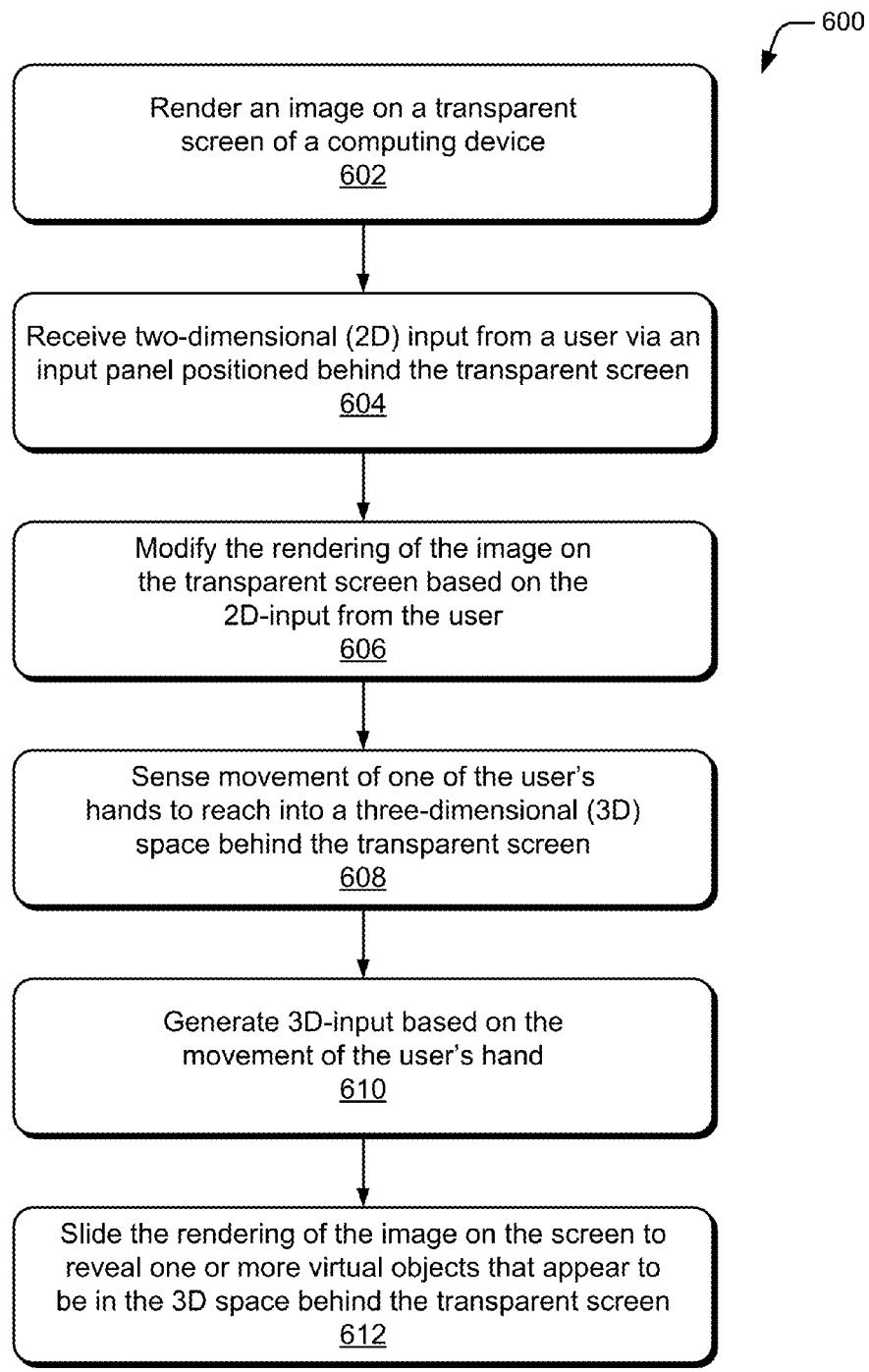
FIG. 6 illustrates an example method implemented by a transparent display device.

FIG. 6 is a flow diagram depicting an example method 600 implemented by a transparent display device. Block 602 renders an image on a transparent screen of a computing device. For example, transparent display device 102 (FIG. 1) renders a 2D or a 3D image on transparent screen 124 of the transparent display device.

Block 604 receives 2D-input from a user via an input panel positioned behind the transparent screen. For example, transparent display device 102 receives 2D-input from a user via input panel 128 that is positioned behind transparent screen 124. Input panel 128 may include any combination of a keyboard configured to receive key-input, or a mouse, track pad, or touch pad configured to receive touch-input.

Block 606 modifies the rendering of the image based on the 2D-input from the user. For example, controller 122 controls transparent display device 102 to modify the rendering of the 2D or 3D image on transparent screen 124 based on the 2D-input received from the user via input panel 128.

Block 608 senses movement of one of the user's hands to reach into a 3D space behind the transparent screen, and block 610 generates 3D-input based on the movement of the user's hand. For example, hand tracker 126 senses movement of one or both of the user's hand to reach into 3D space 206 (FIG. 2) behind transparent screen 124, and generates 3D-input based on the movement.

Block 612 slides the rendering of the image on the screen to reveal one or more virtual objects that appear to be in the 3D-space behind the transparent screen responsive to receiving the 3D-input. For example, controller 122 controls transparent display device 102 to slide the rendering of the 2D or 3D image displayed on transparent screen 124 to reveal one or more virtual objects that appear to be in 3D space 206 behind the transparent screen responsive to receiving the 3D-input from hand tracker 126.

Figure 7:
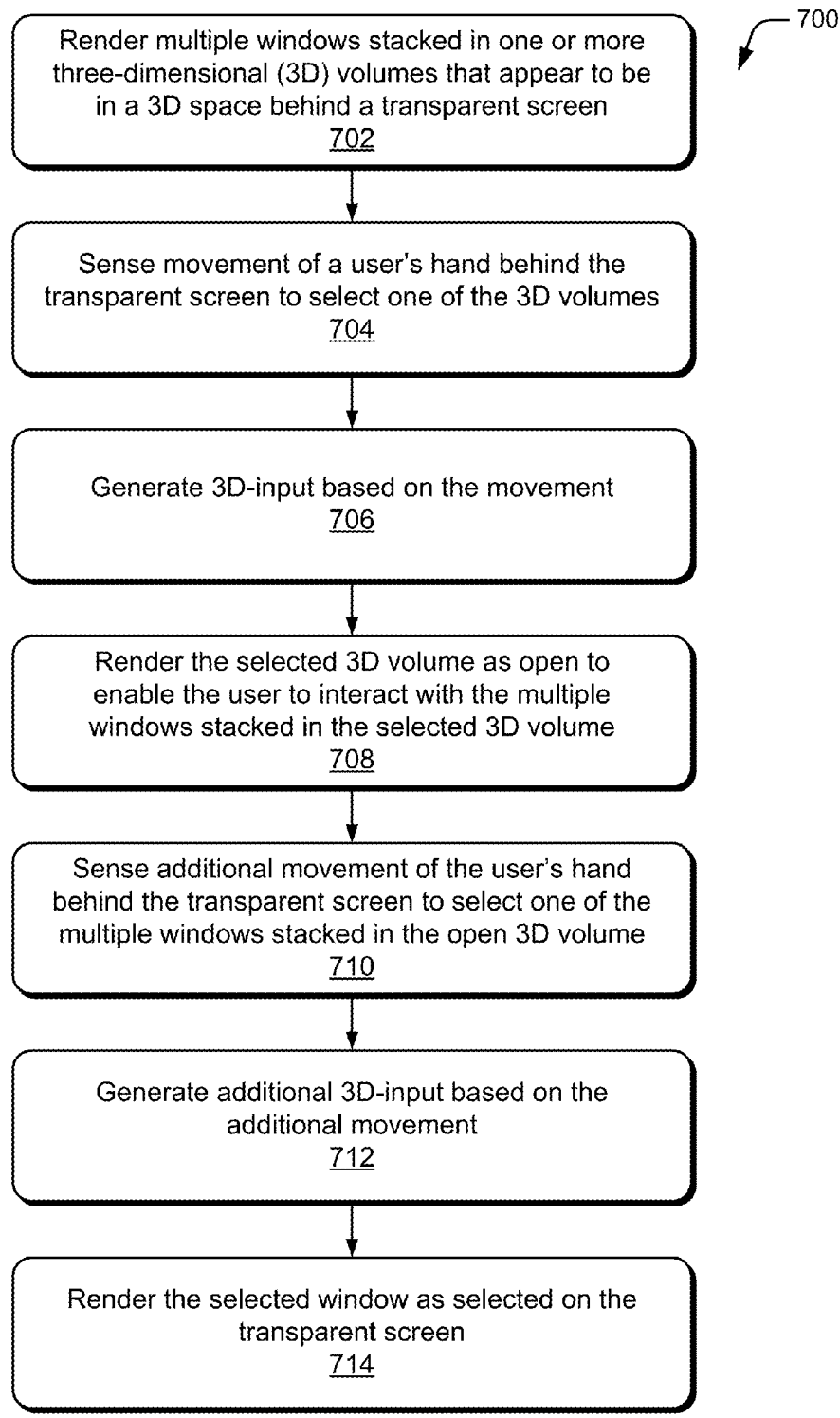
FIG. 7 illustrates an additional example method implemented by a transparent display device.

FIG. 7 is a flow diagram depicting an additional example method 700 implemented by a transparent display device. Block 702 renders multiple windows stacked in one or more 3D volumes that appear to be in a 3D space behind a transparent screen. For example, transparent display device 102 (FIG. 1) renders multiple windows stacked in one or more 3D volumes, such as 3D volumes 502 and 504 (FIG. 5*a*), that appear to be in 3D space 206 behind transparent screen 124.

Block 704 senses movement of a user's hand behind the transparent screen to select one of the 3D volumes, and block 706 generates 3D-input based on the movement. For example, hand tracker 126 senses movement of the user's hand behind transparent screen 124 to select 3D volume 504, and generates 3D-input based on the movement.

Block 708 renders the selected 3D volume as open to enable the user to interact with the multiple windows stacked in the selected 3D volume. For example, controller 122 controls transparent display device 102 to render selected 3D volume 504 (FIG. 5*b*) as open on transparent screen 124 to enable the user to interact with the multiple windows stacked in selected 3D volume 504.

Block 710 senses additional movement of the user's hand behind the transparent screen to select one of the multiple windows stacked in the open 3D volume, and block 712 generates additional 3D-input based on the additional movement. For example, hand tracker 126 senses additional movement of the user's hand behind transparent screen 124 to select window 506 (FIG. 5*c*) stacked in open 3D volume 504, and generates additional 3D-input based on the additional movement.

Block 714 renders the selected window as selected on the transparent screen. For example, controller 122 controls transparent display device 102 to render selected window 506 as selected on transparent screen 124, such as by causing window 506 to pop out of 3D volume 504.

Example Device

Figure 8:
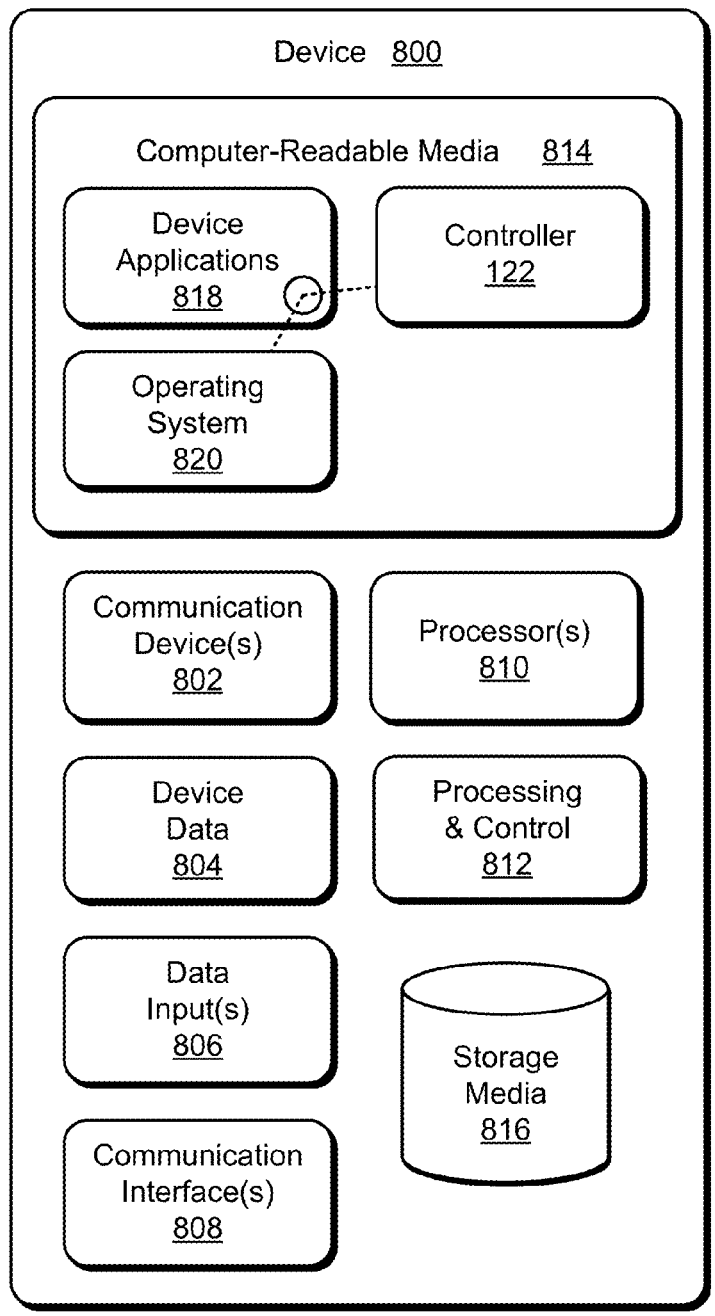
FIG. 8 illustrates an example device in which techniques for a transparent display device can be implemented.

FIG. 8 illustrates various components of example device 800 that can be implemented as any type of client, server, and/or display device as described with reference to the previous FIGS. 1-7 to implement techniques enabling a transparent display device. In embodiments, device 800 can be implemented as one or a combination of a wired and/or wireless device, as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 800 may also be associated with a viewer (e.g., a person or user) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable techniques for implementing a transparent display device. Alternatively or in addition, device 800 can be implemented with any one or combination of hardware, firmware, a system-on-chip (SoC), or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal-processing and control module, code that is native to a particular device, a hardware abstraction layer for a particular device, and so on.

The device applications 818 also include any system components or modules to implement techniques using or enabling a transparent display device. In this example, the device applications 818 can include controller 122 for controlling a transparent display device.

CONCLUSION

This document describes various apparatuses and techniques for implementing a transparent display device. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A transparent display device comprising:
   a transparent screen configured to render two-dimensional (2D) images on the transparent screen, and to render one or more virtual three-dimensional (3D) volumes comprising stacked windows that appear in a 3D space behind the transparent screen, the transparent screen configured to employ a grid to cause the 3D volumes to appear to be in 3D space, each window of the stacked windows selectable to launch, an associated application, file, or page, each of the one or more virtual 3D volumes initially rendered in a closed state;
   a hand tracker configured to sense movement of a user's hands and to enable a user interaction with the one or more virtual 3D volumes in the 3D space behind the transparent screen;
   a processor in communication with the transparent screen and the hand tracker, the processor configured to:
      first select a virtual 3D volume of the one or more virtual 3D volumes based on the movement; and
      second select a window of the selected virtual 3D volume;
   a controller configured to:
      render, responsive to the first selection, the windows of the selected virtual 3D volume in an open state; and
      transition, responsive to the second selection, the transparent screen from a 3D display mode to a 2D display mode by sliding the application, file, or page associated with the selected window in 2D on the transparent screen while simultaneously ceasing to render the one or more virtual 3D volumes to create an appearance of covering the one or more virtual 3D volumes.

2. The transparent display device of claim 1, wherein the transparent screen is configured to be transparent when rendering the one or more 3D volumes that appear in a 3D space behind the transparent screen and the transparent screen is configured to be at least partially opaque when rendering 2D images.

3. The transparent display device of claim 1, further comprising a head tracker that is configured to track a position of a user's head or eyes relative to the transparent screen, and wherein the controller is configured to modify the rendering of the one or more virtual 3D volumes that appear to be in the 3D space behind the transparent screen based on the position of the user's head or eyes.

4. The transparent display device of claim 1, wherein the transparent screen is a liquid crystal display (LCD).

5. A method comprising:
   rendering an image on a transparent screen of a computing device;
   receiving two-dimensional (2D) input from a user via an input panel positioned behind the transparent screen;
   modifying the rendering of the image on the transparent screen based on the 2D-input;
   sensing movement of one of the user's hands to reach into a three-dimensional (3D) space behind the transparent screen;
   generating 3D-input based on the movement of the user's hand;
   responsive to sensing the movement of the one of the user's hands to reach into the 3D space behind the transparent screen and without further user input, transitioning the transparent screen from a 2D display mode to a 3D display mode by simultaneously ceasing to render the image on the transparent screen and revealing one or more virtual 3D volumes comprising stacked windows that appear to be in the 3D space behind the transparent screen, each window of the stacked windows representing, and selectable to launch, an associated application, file, or page, each of the one or more virtual 3D volumes initially rendered in a closed state;
   sensing additional movement of the one of the user's hands to reach towards the input panel; and
   responsive to sensing the additional movement and without further user input, sliding the rendering of the image onto the transparent screen effective to transition the transparent screen from the 3D display mode to the 2D display mode.

6. A method comprising:
   rendering multiple windows stacked in one or more virtual three-dimensional (3D) volumes that appear to be in a 3D space behind a transparent screen, each window of the multiple windows associated with, and selectable to launch, an associated application, file, or page, the virtual 3D volumes being rendered in a closed state;
   sensing movement of a user's hand behind the transparent screen to select one of the one or more virtual 3D volumes;
   generating 3D-input based on the movement;
   rendering the selected virtual 3D volume in an opened state to enable the user to interact with the multiple windows stacked in the selected 3D volume responsive to receiving the 3D-input;
   sensing additional movement of the user's hand behind the transparent screen to select a window of the selected virtual 3D volume;
   generating additional 3D-input based on the additional movement; and
   responsive to sensing the additional movement of the user's hand selecting a window of the selected virtual 3D volume and without further user input, transitioning the transparent screen from a 3D display mode to a two-dimensional (2D) display mode by simultaneously:
      presenting a sliding effect comprising sliding an application, file, or page associated with the selected window in 2D onto the transparent screen; and
      simultaneously ceasing to present the one or more virtual 3D volumes.

7. The method of claim 6, further comprising, responsive to sensing movement of the user's hand behind the transparent screen, rendering feedback on the transparent screen based on the location of the user's hand in the 3D space.

8. The method of claim 7, wherein rendering the feedback further comprises causing the transparent screen to glow based on the location of the user's hand in the 3D space.

9. The method of claim 7, wherein rendering the feedback further comprises causing display of a cursor on the transparent screen based on the location of the user's hand in the 3D space.

10. The method of claim 6, wherein the transparent screen enables the user to see the user's hand behind the transparent screen.

11. The method of claim 6, further comprising sensing a position of the user's head or eyes relative to the transparent screen, and wherein the rendering the multiple windows comprises rendering the multiple windows as stacked in the one or more virtual 3D volumes that appear to be in the 3D space behind the transparent screen based on the position of the user's head or eyes relative to the transparent screen.

12. The method of claim 6, wherein rendering the open state of the selected virtual 3D volume renders each window of the multiple windows as having an increased distance in the 3D space from each other window of the multiple windows, the increased distance being greater than a distance between each window of the multiple windows as rendered in the closed state, the increased distance effective to:

give the multiple windows an expanded appearance; and increase exposure of two or more of the multiple windows.

13. The method of claim 12, wherein rendering the open state of the selected virtual 3D volume concurrently renders the open state of the selected virtual 3D volume and a closed state of at least one other virtual 3D volume of the one or more virtual 3D volumes.

14. The method of claim 6, wherein the movement of the user's hand to select one of the multiple windows causes an area around each window of the multiple windows to glow progressively as the user's hand reaches the respective window, only one window glowing at any given time to indicate a current position of the user's hand with respect to the multiple windows.

15. The method of claim 6, wherein simultaneously presenting the sliding effect and ceasing to present the one or more 3D volumes creates an effect of covering the one or more virtual 3D volumes with the application, file, or pages associated with the selected window.

* * * * *